(12) United States Patent
Hosotani

(10) Patent No.: US 10,998,772 B2
(45) Date of Patent: May 4, 2021

(54) ELECTRIC POWER TRANSMITTING DEVICE AND ELECTRIC POWER RECEIVING DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/717,659

(22) Filed: Dec. 17, 2019

(65) Prior Publication Data

US 2020/0127499 A1 Apr. 23, 2020

Related U.S. Application Data

(63) Continuation of application No. PCT/JP2018/018552, filed on May 14, 2018.

(30) Foreign Application Priority Data

Sep. 12, 2017 (JP) .............................. JP2017-174437

(51) Int. Cl.
*H02J 50/12* (2016.01)
*H02J 50/90* (2016.01)
(Continued)

(52) U.S. Cl.
CPC ............ *H02J 50/20* (2016.02); *H02J 7/0024* (2013.01); *H02J 7/0042* (2013.01); *H02J 50/12* (2016.02); *H02J 50/40* (2016.02); *H02J 50/90* (2016.02)

(58) Field of Classification Search
CPC .......... H02J 5/005; H02J 7/0042; H02J 7/025; H02J 50/10; H02J 50/12; H02J 50/40;
(Continued)

(56) References Cited

U.S. PATENT DOCUMENTS 10,862,341 B2 * 12/2020 Koyanagi ............... H02J 50/12
2002/0154518 A1 * 10/2002 Elferich .................. H02J 50/12
363/15

(Continued)

FOREIGN PATENT DOCUMENTS

JP 2013-165190 A 8/2013
JP 2017-143699 A 8/2017
(Continued)

OTHER PUBLICATIONS

International Search Report issued in PCT/JP2018/018552; dated Jun. 5, 2018.
Written Opinion issued in PCT/JP2018/018552; dated Jun. 5, 2018.

*Primary Examiner* — Levi Gannon
(74) *Attorney, Agent, or Firm* — Studebaker & Brackett PC

(57) ABSTRACT

An electric power transmitting device includes a radio frequency power circuit that converts a direct current power supply to radio frequency electric power having a switching frequency, a transmitting coil connected to the radio frequency power circuit and magnetically coupled to a receiving coil in an electric power receiving device, and a transmitting resonance capacitor that is connected to the transmitting coil and that forms a resonant circuit together with the transmitting coil. The transmitting coil has flexibility to allow a coil opening to be closed, and capacitance of the transmitting resonance capacitor is determined so that while the transmitting coil is opened, resonance of the resonant circuit occurs at a resonant frequency, which matches the switching frequency, and while the transmitting coil is substantially closed, the resonance of the resonant circuit does not occur at the switching frequency, which deviates from a resonant frequency of the resonant circuit.

15 Claims, 5 Drawing Sheets

101

(51) Int. Cl.
*H02J 50/20* (2016.01)
*H02J 50/40* (2016.01)
*H02J 7/00* (2006.01)

(58) Field of Classification Search
CPC ........ H02J 50/70; H02J 50/90; H04B 5/0075; H04B 5/0087; H04B 5/0093
USPC .......................................................... 307/104
See application file for complete search history.

(56) References Cited

U.S. PATENT DOCUMENTS

| | | | |
|---|---|---|---|
| 2005/0154294 A1* | 7/2005 | Uchiyama | A61B 1/0676 600/420 |
| 2013/0310629 A1* | 11/2013 | Lafontaine | H02J 50/50 600/16 |
| 2016/0072297 A1* | 3/2016 | Fine | H02J 50/12 307/104 |
| 2016/0126774 A1 | 5/2016 | Liang | |
| 2016/0181852 A1 | 6/2016 | Penttila et al. | |
| 2017/0329365 A1* | 11/2017 | Wong | A41B 1/08 |
| 2020/0169117 A1* | 5/2020 | Okamoto | H02J 50/005 |

FOREIGN PATENT DOCUMENTS

| | | |
|---|---|---|
| WO | 2016/101244 A1 | 6/2016 |
| WO | 2016/203720 A1 | 12/2016 |

\* cited by examiner

ELECTRIC POWER TRANSMITTING DEVICE AND ELECTRIC POWER RECEIVING DEVICE

CROSS-REFERENCE TO RELATED APPLICATIONS

This application claims benefit of priority to International Patent Application No. PCT/JP2018/018552, filed May 14, 2018, and to Japanese Patent Application No. 2017-174437, filed Sep. 12, 2017, the entire contents of each are incorporated herein by reference.

BACKGROUND

Technical Field

The present disclosure relates to an apparatus that uses an electric power transmitting device including a transmitting coil and an electric power receiving device including a receiving coil and that wirelessly transmits electric power from the electric power transmitting device to the electric power receiving device.

Background Art

For a system that wirelessly transmits electric power by using coupling between an transmitting coil in an electric power transmitting device and a receiving coil in an electric power receiving device via a magnetic field, the size of the transmitting coil and the size of the receiving coil are designed in accordance with the magnitude of necessary electric power to be transmitted.

In general, a small-sized receiving coil can be constructed for a small-sized electric power receiving device, which requires a small amount of electric power consumption. However, the efficiency in receiving electric power deteriorates rapidly as a receiving coil is downsized. For this reason and other reasons, it is difficult to downsize a receiving coil to the same degree as downsizing of the body of an electric power receiving device. Thus, Japanese Unexamined Patent Application Publication No. 2013-165190 discloses a wireless electric power receiving device that can reduce the size of the coil opening of a receiving coil when not in use.

SUMMARY

The device described above enables the receiving coil to be folded when not in use to reduce the effective coil opening and is useful for improving the portability of the electric power receiving device when not in use.

However, Japanese Unexamined Patent Application Publication No. 2013-165190 does not pay particular attention to circuit operations that vary as the coil opening is opened or closed. In particular, if a coil that is constructed so that the coil opening can be opened or closed is applied to a transmitting coil, issues to be addressed, such as generation of electric power loss, generation of heat, and generation of unnecessary radiation during nonuse, arise.

Accordingly, the present disclosure provides an electric power transmitting device and an electric power receiving device that perform appropriate circuit operations in response to opening and closing of a coil opening and that reduce or suppress generation of an unnecessary radio frequency magnetic field, generation of an unnecessary resonant current, and anomalous circuit operations.

(1) An electric power transmitting device according to the present disclosure includes a radio frequency power circuit that converts a direct current power supply to radio frequency electric power having a switching frequency, a transmitting coil that is electrically connected to a radio frequency output of the radio frequency power circuit and that is magnetically coupled to a receiving coil in an electric power receiving device, and a transmitting resonance capacitor that is electrically connected to the transmitting coil and that forms a transmitting resonant circuit together with the transmitting coil. The transmitting coil has a coil conductor sheathed in an insulating material and has flexibility to allow a coil opening to be closed, and capacitance of the transmitting resonance capacitor is determined so that while the transmitting coil is opened, resonance of the transmitting resonant circuit occurs at the switching frequency and while the transmitting coil is substantially closed, the resonance of the transmitting resonant circuit does not occur at the switching frequency, which deviates from a resonant frequency of the transmitting resonant circuit.

According to the above configuration, resonance of the resonant circuit occurs at the switching frequency while the transmitting coil is opened, and the resonance of the resonant circuit does not occur at the switching frequency while the transmitting coil is substantially closed. Thus, when not in use, substantially closing the transmitting coil is sufficient to reduce or suppress a current flowing through the transmitting coil and to reduce or suppress generation of a radio frequency magnetic field (unnecessary radiation) in the transmitting coil. In addition, unnecessary electric power consumption is also reduced or suppressed. Further, heat generation in the radio frequency power circuit and the transmitting coil is also reduced or suppressed.

(2) While the transmitting coil is closed, the transmitting coil preferably causes magnetic fluxes generated by the coil conductor to cancel out each other and preferably reduces or suppresses generation of a radio frequency magnetic field. Consequently, generation of an unnecessary radio frequency magnetic field in the transmitting coil is efficiently reduced or suppressed.

(3) While the transmitting coil is opened, the transmitting coil preferably has a shape in accordance with a shape of the receiving coil. Consequently, the magnetic coupling between the transmitting coil and the receiving coil can efficiently be increased, and a high degree of power transmission efficiency is obtained while the transmitting coil is opened.

(4) While the transmitting coil is opened, the coil opening of the transmitting coil is preferably larger than an external size of the receiving coil. While the transmitting coil is substantially closed, the coil opening of the transmitting coil is preferably smaller than the external size of the receiving coil. Consequently, reducing the size of the transmitting coil while the transmitting coil is substantially closed is possible, whereas the power transmission efficiency is maintained while the transmitting coil is opened.

(5) The transmitting coil and an output portion of the radio frequency power circuit are preferably connected to each other by using a twisted pair cable. Consequently, unnecessary radiation from the portion connecting the transmitting coil and the radio frequency power circuit is reduced or suppressed. In addition, the region of the resonant circuit formed by the transmitting coil and the transmitting resonance capacitor is clearly defined (the twisted pair cable is outside the resonant circuit), and variation in the resonant frequency due to usage conditions is reduced or suppressed.

(6) The transmitting coil preferably has an effective cross-sectional area of 4 A/mm² or less. Consequently, heat generation in the transmitting coil is reduced or suppressed, and an anomalous heat generation is avoided.

(7) An electric power receiving device according to the present disclosure includes a receiving coil that is magnetically coupled to a transmitting coil included in an electric power transmitting device and in which a current having the same frequency as an oscillation frequency of a radio frequency magnetic field flows, the radio frequency magnetic field being generated by the transmitting coil to which the receiving coil is magnetically coupled, a receiving resonance capacitor that is electrically connected to the receiving coil and that forms a receiving resonant circuit together with the receiving coil, a rectifying circuit that is connected to the receiving coil, and a load circuit that is connected to the rectifying circuit. The receiving coil has a coil conductor sheathed in an insulating material and has flexibility to allow a coil opening to be closed, and capacitance of the receiving resonance capacitor is determined so that while the receiving coil is opened, resonance of the receiving resonant circuit occurs at a resonant frequency, which matches an oscillation frequency of the radio frequency magnetic field, and while the receiving coil is substantially closed, the resonance of the receiving resonant circuit does not occur, a resonant frequency of the receiving resonant circuit deviating from the oscillation frequency of the radio frequency magnetic field.

According to the above configuration, resonance of the resonant circuit occurs at the frequency of the radio frequency magnetic field while the receiving coil is opened, and the resonance of the resonant circuit does not occur at the frequency of the radio frequency magnetic field while the receiving coil is substantially closed. Thus, when not in use, substantially closing the receiving coil is sufficient to reduce or suppress a current flowing through the receiving coil and to reduce or suppress unnecessary electric power reception. Further, heat generation in the load circuit, the rectifying circuit, and the receiving coil is reduced or suppressed.

(8) While the receiving coil is closed, the receiving coil preferably reduces or suppresses a magnetic flux passing through the receiving coil and preferably reduces or suppresses generation of a resonant current. Consequently, a current flowing through the receiving coil while electric power is not received is efficiently reduced or suppressed.

(9) While the receiving coil is opened, the receiving coil preferably has a shape in accordance with a shape of the transmitting coil. Consequently, the magnetic coupling between the transmitting coil and the receiving coil can efficiently be increased, and a high degree of power transmission efficiency is obtained while the receiving coil is opened.

(10) The receiving coil and an input portion of the rectifying circuit are preferably connected to each other by using a twisted pair cable. Consequently, unnecessary radiation from the portion connecting the receiving coil and the rectifying circuit is reduced or suppressed. In addition, the region of the resonant circuit formed by the receiving coil and the receiving resonance capacitor is clearly defined (the twisted pair cable is outside the resonant circuit), and variation in the resonant frequency due to usage conditions is reduced or suppressed.

(11) The receiving coil preferably has an effective cross-sectional area of 4 A/mm² or less. Consequently, heat generation in the receiving coil is reduced or suppressed, and an anomalous heat generation is avoided.

According to the present disclosure, when not in use, substantially closing the transmitting coil is sufficient to reduce or suppress a current flowing through the transmitting coil and thereby reduce or suppress generation of an unnecessary radio frequency magnetic field in the transmitting coil in the electric power transmitting device. Thus, unnecessary electric power consumption is reduced or suppressed, and heat generation in the radio frequency power circuit and the transmitting coil is reduced or suppressed. Further, while the transmitting coil is closed, magnetic fluxes generated by a resonant current flowing through the coil conductor cancel out each other, and generation of a radio frequency magnetic field is reduced or suppressed. In addition, when not in use, substantially closing the receiving coil is sufficient to reduce or suppress a current flowing through the receiving coil in the electric power receiving device. Thus, unnecessary electric power reception is reduced or suppressed, and heat generation in the load circuit, the rectifying circuit, and the receiving coil is reduced or suppressed. Further, while the receiving coil is closed, a magnetic flux passing through the coil conductor is reduced or suppressed and generation of a resonant current is reduced or suppressed.

DETAILED DESCRIPTION

Hereinafter, several specific examples will be described with reference to the drawings, and a plurality of embodiments to carry out the present disclosure will be presented. In each figure, the same portion is denoted by the same numeral or symbol. Although embodiments will be described separately as appropriate in consideration of easiness of describing or understanding main features, partial substitutions or combinations of configurations illustrated in different embodiments can be made. In a second embodiment and a subsequent embodiment, features common to a first embodiment will not be described and only different features will be described. In particular, similar operations and similar advantages achievable by similar configurations will not individually be described in each of the embodiments.

First Embodiment

Figure 1A:
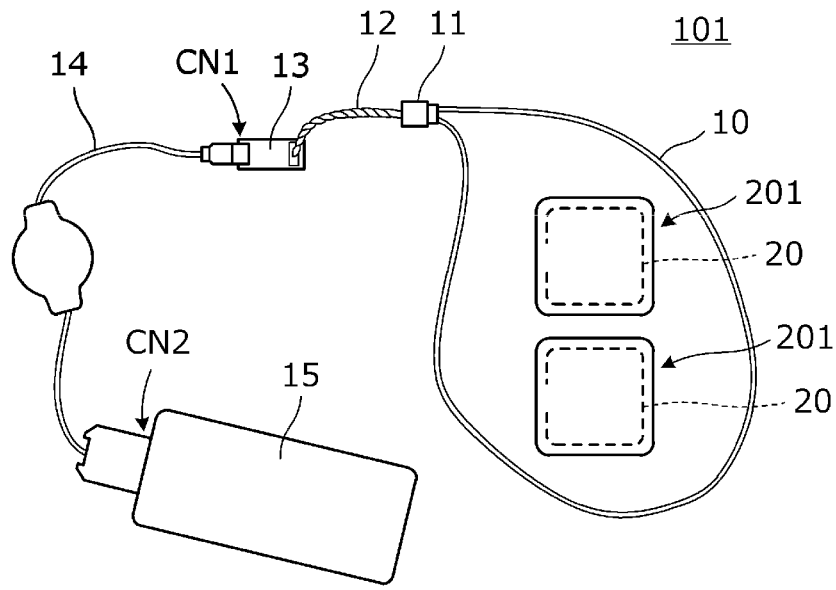
FIG. 1 A, FIG. 1 B, and FIG. 1 C are outside drawings of an electric power transmitting device according to an embodiment of the present disclosure.
Figure 1B:
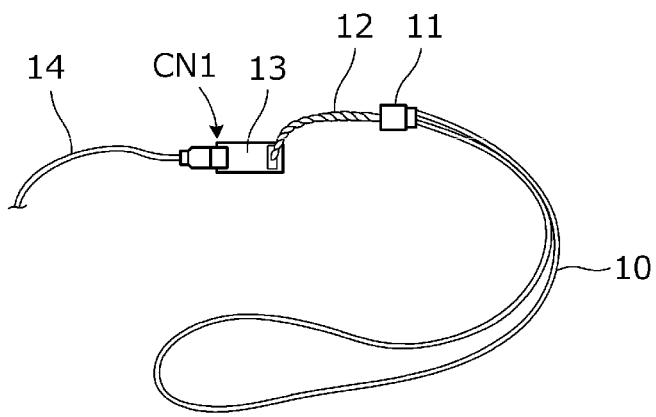
Figure 1C:
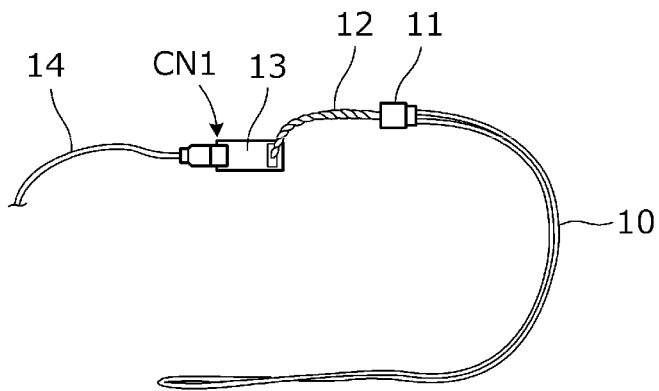

FIG. 1A, FIG. 1B, and FIG. 1C are outside drawings of an electric power transmitting device 101 according to an embodiment of the present disclosure.

The example depicted in FIG. 1A illustrates two electric power receiving devices 201 and the electric power transmitting device 101 that wirelessly transmits electric power to the two electric power receiving devices 201.

The electric power transmitting device 101 includes a transmitting coil 10, a transmitting coil connecting unit 11, a twisted pair cable 12, a radio frequency power circuit 13, a power supply cable 14, and a direct current power supply 15.

The transmitting coil 10 includes a coil conductor sheathed in an insulating material and has flexibility to allow the coil opening to be closed. In the state depicted in FIG. 1A, the transmitting coil 10 substantially forms a circle and has one turn. In the state depicted in FIG. 1B, the transmitting coil 10 is almost closed, bent, and folded. Further, in the state depicted in FIG. 1C, the transmitting coil 10 is completely closed. Namely, two portions of the coil conductor of the transmitting coil 10 run parallel to each other, and no spacing is substantially present between the two portions, which originally form a coil opening. Two insulating materials in each of which one of the two portions is sheathed are in contact with each other wherever the two portions of the coil conductor of the transmitting coil 10 run parallel to each other.

The transmitting coil connecting unit 11 includes a transmitting resonance capacitor that forms a resonant circuit together with the transmitting coil 10.

The radio frequency power circuit 13 and the transmitting coil connecting unit 11 are connected to each other via the twisted pair cable 12. The radio frequency power circuit 13 and the direct current power supply 15 are connected to each other via the power supply cable 14.

The power supply cable 14 has a reel and can be extended or shortened. The power supply cable 14 is connected at one end to the radio frequency power circuit 13 via a connector CN1 and connected at the other end to the direct current power supply 15 via a connector CN2.

The direct current power supply 15 is a power supply circuit that uses a battery as a source and that converts the voltage of the battery to a predetermined direct current voltage.

The electric power receiving device 201 includes a receiving coil 20. The receiving coil 20 is placed inside the opening of the transmitting coil 10, and thus the receiving coil 20 and the transmitting coil 10 are magnetically coupled to each other.

Figure 2:
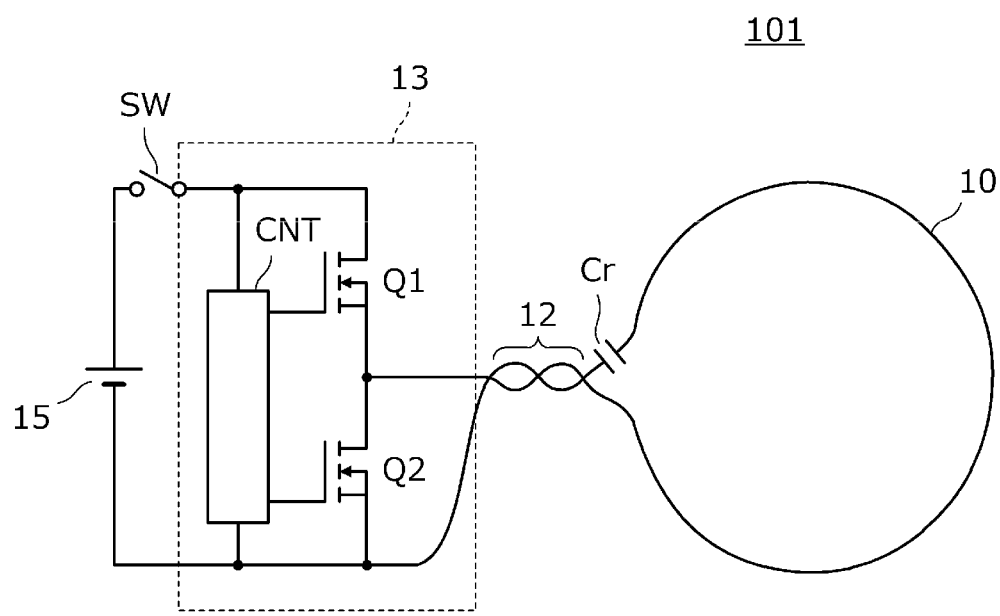
FIG. 2 is a circuit diagram of the electric power transmitting device.

FIG. 2 is a circuit diagram of the electric power transmitting device 101. As depicted in FIG. 2, the electric power transmitting device 101 includes the transmitting coil 10 and a transmitting resonance capacitor Cr that are connected to each other in series and that are connected to the radio frequency power circuit 13 via the twisted pair cable 12. The radio frequency power circuit 13 includes a high-side switching element Q1, a low-side switching element Q2, and a switching control circuit CNT that controls the two switching elements Q1 and Q2. The radio frequency power circuit 13 uses the direct current power supply 15 as a power supply for operation. A switch SW is disposed between the direct current power supply 15 and the radio frequency power circuit 13.

The switching control circuit CNT switches states of the switching element Q1 and states of the switching element Q2 alternately with a dead time in between at a predetermined frequency within a frequency band ranging, for example, from 6 MHz to 14 MHz.

As depicted in FIG. 1A, resonance of a resonant circuit formed by the transmitting coil 10 and the transmitting resonance capacitor Cr occurs at the above switching frequency while the transmitting coil 10 is opened. Namely, the resonant frequency of the resonant circuit is substantially equal to the switching frequency while the transmitting coil 10 is opened.

In this way, the transmitting coil 10, which is opened, generates a radio frequency magnetic field, and electric power is wirelessly transmitted to the electric power receiving device 201.

As depicted in FIG. 1B and FIG. 1C, while the transmitting coil 10 is closed, the transmitting coil does not operate as a coil for generating a magnetic field. In addition, the inductance of the transmitting coil 10 is smaller while the transmitting coil 10 is closed, and thus resonance of the resonant circuit formed by the transmitting coil 10 and the transmitting resonance capacitor Cr does not occur at the above switching frequency. Namely, the resonant frequency determined by the transmitting coil 10, which is closed, and the transmitting resonance capacitor Cr greatly differs from the switching frequency.

The capacitance of the transmitting resonance capacitor Cr is determined so that resonance of the resonant circuit occurs at the switching frequency while the transmitting coil 10 is opened and does not occur at the switching frequency while the transmitting coil 10 is closed.

Further, if two portions of the coil conductor of the transmitting coil 10 run parallel to each other, magnetic fluxes generated by currents flowing through the two portions of the coil conductor cancel out each other. Thus, generation of a radio frequency magnetic field is reduced or suppressed. Namely, when the transmitting coil 10 is closed, the magnetic fluxes generated by the coil conductor of the transmitting coil 10 cancel out each other, and the transmitting coil 10 reduces or suppresses the generation of a radio frequency magnetic field.

Since the transmitting coil 10 and the output portion of the radio frequency power circuit 13 are connected to each other by using the twisted pair cable 12, unnecessary radiation from the portion connecting the transmitting coil 10 and the radio frequency power circuit 13 is reduced or suppressed. In addition, the region of the resonant circuit formed by the transmitting coil 10 and the transmitting resonance capacitor Cr is clearly defined (the twisted pair cable 12 is outside the resonant circuit), and variation in the resonant frequency due to usage conditions is reduced or suppressed.

While the transmitting coil 10 is opened, the transmitting coil 10 preferably has a shape in accordance with the shape of the receiving coil 20. Consequently, the magnetic coupling between the transmitting coil 10 and the receiving coil 20 can efficiently be increased, and a high degree of power transmission efficiency is obtained when the transmitting coil 10 is opened. In addition, the transmitting coil 10 has flexibility and is easily deformed. Thus, when transmission is not performed, the transmitting coil 10 is, for example, tied up in a bundle, bent, or doubled and rounded. In this way, the transmitting coil 10 is highly portable and highly convenient.

While the transmitting coil 10 is opened, the transmitting coil 10 is preferably larger than the external size of the receiving coil 20. While the transmitting coil 10 is substantially closed, the coil opening is preferably smaller than the external size of the receiving coil 20. Consequently, reducing the size of the transmitting coil while the transmitting coil is substantially closed is possible, whereas the power transmission efficiency is maintained while the transmitting coil 10 is opened.

The transmitting coil 10 preferably has an effective cross-sectional area of 4 A/mm$^2$ or less. Consequently, heat generation in the transmitting coil 10 is reduced or suppressed, and an anomalous heat generation is avoided.

Figure 3A:
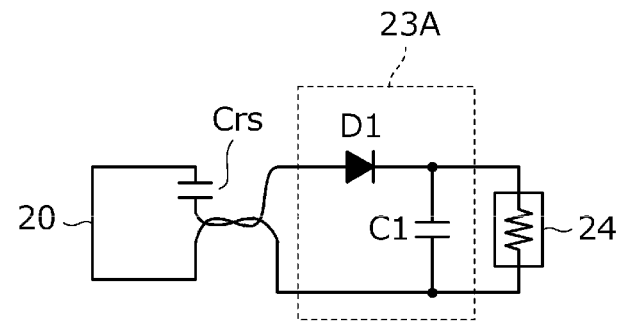
FIG. 3 A, FIG. 3 B, and FIG. 3 C are circuit diagrams of electric power receiving devices.
Figure 3B:
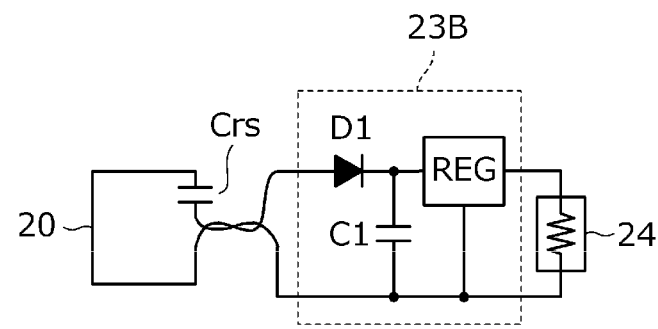
Figure 3C:
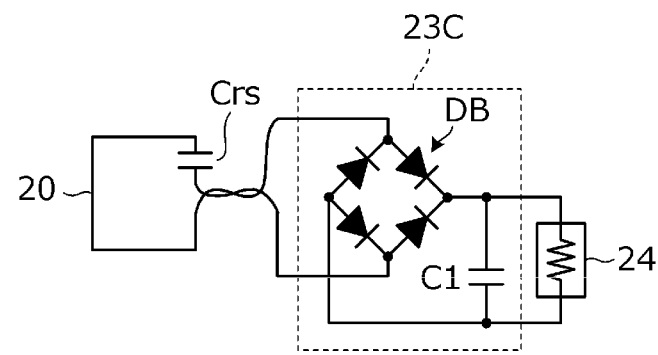

FIG. 3A, FIG. 3B, and FIG. 3C are circuit diagrams of electric power receiving devices. The electric power receiving device depicted in FIG. 3A includes a receiving coil 20, a rectifying circuit 23A, and a load circuit 24.

The receiving coil 20 includes a receiving resonance capacitor Crs that forms a resonant circuit together with the receiving coil 20.

The rectifying circuit 23A is formed by a rectifying diode D1 and a smoothing capacitor C1. The rectifying circuit 23A rectifies and smooths an electromotive force in the resonant circuit formed by the receiving coil 20 and the receiving resonance capacitor Crs and supplies direct current electric power to the load circuit 24.

Resonance of the resonant circuit formed by the receiving coil 20 and the receiving resonance capacitor Crs occurs at the oscillation frequency of a radio frequency magnetic field originating in the transmitting coil 10 in the electric power transmitting device 101. The receiving coil 20 is magnetically coupled to the transmitting coil 10 in the electric power transmitting device 101, and a current having the same frequency as the oscillation frequency of the radio frequency magnetic field originating in the transmitting coil 10 flows in the receiving coil 20. Consequently, the electromotive force in the resonant circuit is rectified and smoothed by the rectifying circuit 23A, and direct current electric power is supplied to the load circuit 24.

In the example depicted in FIG. 3B, a rectifying circuit 23B is formed by a rectifying diode D1, a smoothing capacitor C1, and a regulator circuit REG Other elements and configurations are the same as or similar to those of the electric power receiving device depicted in FIG. 3A. The regulator circuit REG stabilizes at a fixed voltage a direct current voltage rectified by the rectifying diode D1 and smoothed by the smoothing capacitor C1.

In the example depicted in FIG. 3C, a rectifying circuit 23C is formed by a diode bridge DB and a smoothing capacitor C1. Other elements and configurations are the same as or similar to those of the electric power receiving device depicted in FIG. 3A. The electromotive force in the resonant circuit is subjected to full-wave rectification by the diode bridge DB and efficiently converted to direct current electric power by the rectifying circuit 23C.

Second Embodiment

Figure 4A:
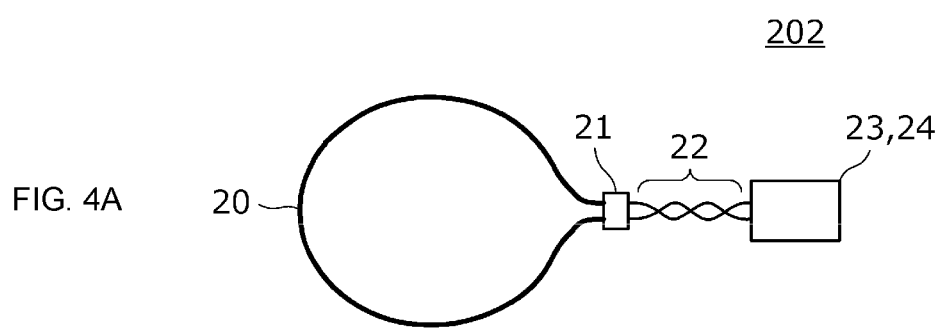
FIG. 4 A and FIG. 4 B are plan views of an electric power receiving device according to a second embodiment.
Figure 4B:
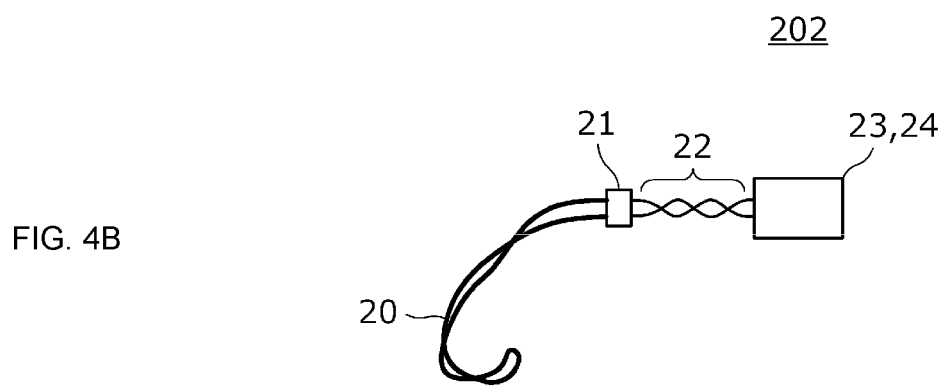

FIG. 4A and FIG. 4B are plan views of an electric power receiving device 202 according to a second embodiment. The electric power receiving device 202 includes a receiving coil 20, a receiving coil connecting unit 21, a twisted pair cable 22, a rectifying circuit 23, and a load circuit 24.

The receiving coil connecting unit 21 includes a receiving resonance capacitor that forms a resonant circuit together with the receiving coil. The rectifying circuit 23 and the receiving coil connecting unit 21 are connected to each other via the twisted pair cable 22.

The receiving coil 20 includes a coil conductor sheathed in an insulating material and has flexibility to allow the coil opening to be closed.

FIG. 4A depicts the receiving coil 20 when the receiving coil 20 is opened. FIG. 4B depicts the receiving coil 20 when the receiving coil 20 is closed.

As depicted in FIG. 4A, while the receiving coil 20 is opened, resonance of a resonant circuit formed by the receiving coil 20 and the receiving resonance capacitor occurs at the frequency of a radio frequency magnetic field generated by the transmitting coil 10. Namely, while the receiving coil 20 is opened, the resonant frequency of the resonant circuit is substantially equal to the frequency of the radio frequency magnetic field generated by the transmitting coil 10.

In this way, while the receiving coil 20 is opened, a current is induced in the resonant circuit formed by the receiving coil 20 and the receiving resonance capacitor. Then, the current is rectified by the rectifying circuit 23, and electric power is supplied to the load circuit 24.

As depicted in FIG. 4B, while the receiving coil 20 is closed, the receiving coil 20 does not operate as a coil through which a magnetic flux passes. In addition, the inductance of the receiving coil 20 is smaller while the receiving coil 20 is closed, and thus resonance of the resonant circuit formed by the receiving coil 20 and the receiving resonance capacitor does not occur at the above switching frequency. Namely, the resonant frequency of the resonant circuit formed by the receiving coil 20, which is closed, and the receiving resonance capacitor greatly differs from the frequency of the radio frequency magnetic field generated by the transmitting coil 10. Accordingly, the radio frequency magnetic field is not substantially received.

The capacitance of the receiving resonance capacitor in the electric power receiving device is determined so that resonance of the resonant circuit occurs at the frequency of the radio frequency magnetic field generated by the transmitting coil 10 while the receiving coil 20 is opened and does not occur at the frequency of the radio frequency magnetic field generated by the transmitting coil 10 while the receiving coil 20 is closed.

While the receiving coil 20 is opened, the receiving coil 20 preferably has a shape in accordance with the shape of the transmitting coil 10 depicted in FIG. 1A. Consequently, the magnetic coupling between the transmitting coil 10 and the receiving coil 20 can efficiently be increased, and a high degree of power transmission efficiency is obtained when the receiving coil 20 is opened.

Since the receiving coil 20 and the input portion of the rectifying circuit 23 are connected to each other by using the twisted pair cable 22, unnecessary radiation from the portion connecting the receiving coil 20 and the rectifying circuit 23 is reduced or suppressed. In addition, the region of the resonant circuit formed by the receiving coil 20 and the receiving resonance capacitor is clearly defined (the twisted pair cable is outside the resonant circuit), and variation in the resonant frequency due to usage conditions is reduced or suppressed.

The receiving coil 20 preferably has an effective cross-sectional area of 4 A/mm$^2$ or less. Consequently, heat generation in the receiving coil 20 is reduced or suppressed, and an anomalous heat generation is avoided.

Third Embodiment

Figure 5A:
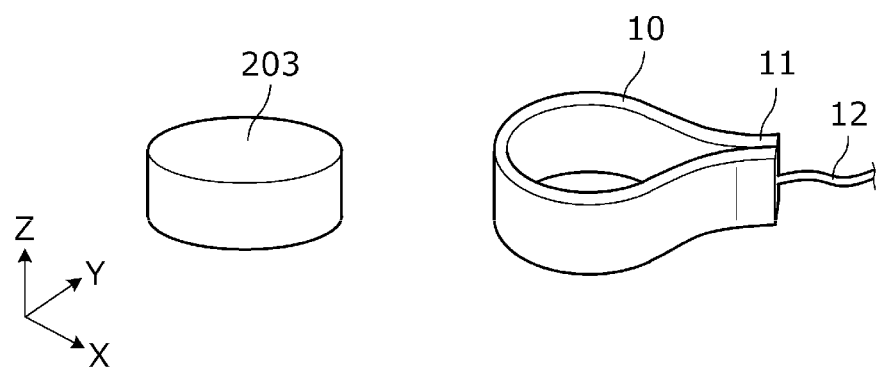
FIG. 5 A, FIG. 5 B, and FIG. 5 C are perspective views of configurations of an electric power transmitting device and an electric power receiving device according to a third embodiment.
Figure 5B:
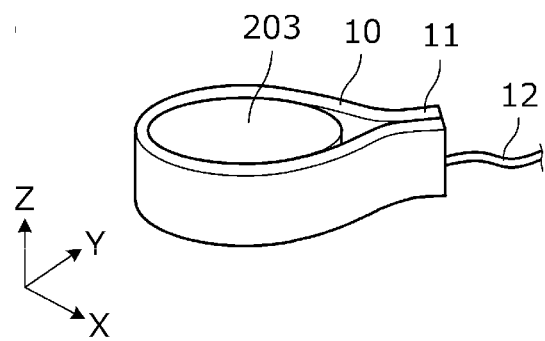
Figure 5C:
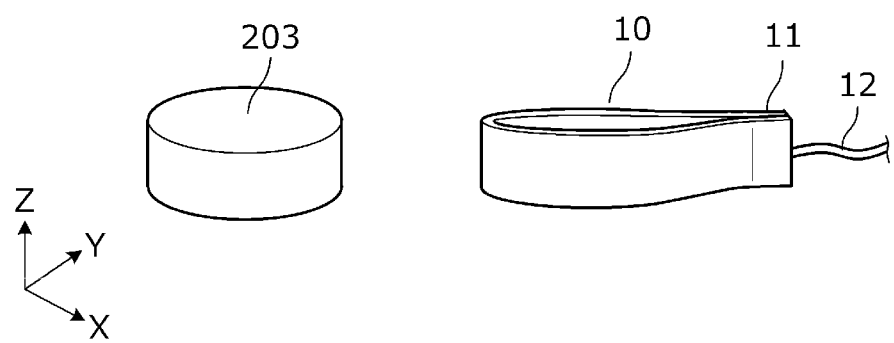

FIG. 5A, FIG. 5B, and FIG. 5C are perspective views of configurations of an electric power transmitting device and an electric power receiving device according to a third embodiment. An electric power receiving device 203 has a cylindrical external form. The electric power transmitting device includes a transmitting coil 10, a transmitting coil connecting unit 11, and a twisted pair cable 12. The structure of the transmitting coil 10 is different from the transmitting coil 10 in the electric power transmitting device 101 described in the first embodiment.

The transmitting coil 10 in the present embodiment has a beltlike form, and when in use, the transmitting coil 10 is placed around the electric power receiving device 203 so as to surround (encircle) the side surface of the electric power receiving device 203 as depicted in FIG. 5B. The electric power receiving device 203 includes in the body a receiving coil whose winding axis is parallel to the Z-axis direction. Accordingly, the transmitting coil 10 and the receiving coil are magnetically coupled to each other in the state depicted in FIG. 5B.

The transmitting coil 10 and the receiving coil are not magnetically coupled to each other in the states depicted in FIG. 5A and FIG. 5C. In particular, while the transmitting coil 10 is closed as depicted in FIG. 5C, resonance of the resonant circuit in the electric power transmitting device does not occur, and electric power consumption is reduced.

Although a single electric power receiving device 203 is surrounded by a single transmitting coil 10 when in use in the example depicted in FIG. 5B, a plurality of electric power receiving devices 203 may be surrounded by a single transmitting coil 10, and thus electric power can be transmitted to the plurality of electric power receiving devices simultaneously.

In any one of the embodiments described above, as a rule, when the electric power transmitting device 101 is used, the switch SW is turned on, and when the electric power transmitting device 101 is not used, the switch SW may be turned off. However, as described above, substantially closing the transmitting coil 10 is sufficient to stop electric power transmission. Further, while the transmitting coil 10 is substantially closed, electric power consumption is small, and thus the switch SW may remain on during nonuse for a short period. If a user forgets to turn off the switch SW, the amount of additional electric power consumption is small. In addition, while the transmitting coil 10 is closed, electric power is not wirelessly transmitted. Thus, an operation procedure is not necessarily performed in the order in which the switch SW is turned on after the transmitting coil 10 is opened, and the transmitting coil 10 may be opened after the switch SW is turned on. Namely, if the switch SW is turned on while the transmitting coil 10 is closed, no unnecessary radiation appears, and the surroundings are not affected.

In the examples depicted in FIG. 1A, FIG. 1B, FIG. 1C, and FIG. 2, a transmitting coil having approximately one turn is presented, but the transmitting coil may have a plurality of turns. Further, a receiving coil may also have a plurality of turns instead of one turn. Alternatively, a coil having a spiral form may also be adopted.

Finally, the above descriptions of the embodiments are illustrative in every respect and are not meant to be limiting. Modifications and variations can be performed as appropriate by those skilled in the art. The scope of the present disclosure is defined not by the embodiments described above but by the claims. Further, the scope of the present disclosure includes modifications of the embodiments within the scope of the claims and equivalents.

What is claimed is:

1. An electric power transmitting device comprising:
a radio frequency power circuit that converts a direct current power supply to radio frequency electric power having a switching frequency;
a transmitting coil that is electrically connected to a radio frequency output of the radio frequency power circuit and that is magnetically coupled to a receiving coil in an electric power receiving device; and
a transmitting resonance capacitor that is electrically connected to the transmitting coil and that forms a transmitting resonant circuit together with the transmitting coil, wherein
the transmitting coil has a coil conductor sheathed in an insulating material and has flexibility to allow a coil opening to be closed,
the radio frequency power circuit includes a controller, a first switching element connected to the transmitting coil and a second switching element connected to the transmitting coil,
capacitance of the transmitting resonance capacitor is determined so that while the transmitting coil is opened, resonance of the transmitting resonant circuit occurs at the switching frequency and while the transmitting coil is substantially closed, the resonance of the transmitting resonant circuit does not occur at the switching frequency, which deviates from a resonant frequency of the transmitting resonant circuit,
while the transmitting coil is substantially closed, the controller is configured to alternately switch states of the first and second switching elements with a dead time between switching of the states such that the transmitting coil causes magnetic fluxes generated by the coil conductor to cancel out each other and reduces or suppresses generation of a radio frequency magnetic field, and
while the transmitting coil is opened, the transmitting coil is larger than an external size of the receiving coil.

2. The electric power transmitting device according to claim 1, wherein
while the transmitting coil is opened, the transmitting coil has a shape in accordance with a shape of the receiving coil.

3. The electric power transmitting device according to claim 2, wherein
while the transmitting coil is substantially closed, the transmitting coil is smaller than the external size of the receiving coil.

4. The electric power transmitting device according to claim 1, wherein
while the transmitting coil is substantially closed, the transmitting coil is smaller than the external size of the receiving coil.

5. The electric power transmitting device according to claim 1, wherein
the transmitting coil and an output portion of the radio frequency power circuit are connected to each other by using a twisted pair cable.

6. The electric power transmitting device according to claim 1, wherein
the transmitting coil has an effective cross-sectional area of 4 A/mm$^2$ or less.

7. An electric power system comprising:
the electric power transmitting device according to claim 1, and
wherein
the electric power receiving device comprises:
the receiving coil that is magnetically coupled to the transmitting coil included in the electric power transmitting device and in which a current having the same frequency as an oscillation frequency of a radio frequency magnetic field flows, the radio frequency magnetic field being generated by the transmitting coil to which the receiving coil is magnetically coupled;
a receiving resonance capacitor that is electrically connected to the receiving coil and that forms a receiving resonant circuit together with the receiving coil;
a rectifying circuit that is connected to the receiving coil; and a load circuit that is connected to the rectifying circuit, wherein the receiving coil has a coil conductor sheathed in an insulating material and has flexibility to allow a coil opening to be closed, and capacitance of the receiving resonance capacitor is determined so that while the receiving coil is opened, resonance of the receiving resonant circuit occurs at a resonant frequency, which matches an oscillation frequency of the radio frequency magnetic field, and while the receiving coil is substantially closed, the resonance of the receiving resonant circuit does not occur, a resonant frequency of the receiving resonant circuit deviating from the oscillation frequency of the radio frequency magnetic field.

8. The electric power system according to claim 7, wherein while the receiving coil is closed, the receiving coil reduces or suppresses a magnetic flux passing through the receiving coil and reduces or suppresses generation of a resonant current.

9. The electric power system according to claim 8, wherein while the receiving coil is opened, the receiving coil has a shape in accordance with a shape of the transmitting coil.

10. The electric power system according to claim 8, wherein the receiving coil and an input portion of the rectifying circuit are connected to each other by using a twisted pair cable.

11. The electric power system according to claim 8, wherein the receiving coil has an effective cross-sectional area of 4 A/mm$^2$ or less.

12. The electric power system according to claim 7, wherein while the receiving coil is opened, the receiving coil has a shape in accordance with a shape of the transmitting coil.

13. The electric power system according to claim 12, wherein the receiving coil and an input portion of the rectifying circuit are connected to each other by using a twisted pair cable.

14. The electric power system according to claim 7, wherein the receiving coil and an input portion of the rectifying circuit are connected to each other by using a twisted pair cable.

15. The electric power system according to claim 7, wherein the receiving coil has an effective cross-sectional area of 4 A/mm$^2$ or less.

* * * * *